United States Patent [19]

Young et al.

[11] Patent Number: 4,879,746

[45] Date of Patent: Nov. 7, 1989

[54] VOICE COMMUNICATION LINK INTERFACE APPARATUS

[75] Inventors: Robert F. Young; Vladimir Kraz, both of Santa Cruz, Calif.

[73] Assignee: Plantronics, Inc., Santa Cruz, Calif.

[21] Appl. No.: 139,853

[22] Filed: Dec. 30, 1987

[51] Int. Cl.[4] ............................................. H04M 1/60
[52] U.S. Cl. .................................... 379/399; 379/395; 379/387
[58] Field of Search .......................... 333/14; 381/106; 379/409, 388, 389, 390, 387, 395, 406, 392

[56] References Cited

U.S. PATENT DOCUMENTS

| | | |
|---|---|---|
| 3,562,791 | 2/1971 | Baker . |
| 3,725,585 | 4/1973 | Moniak et al. . |
| 3,969,680 | 7/1976 | Wermuth . |
| 4,012,596 | 3/1977 | West, Jr. et al. ................ 379/389 X |
| 4,457,014 | 6/1984 | Bloy .................. 381/106 X |
| 4,536,888 | 8/1985 | Wilson ............................ 381/106 X |
| 4,641,339 | 2/1987 | Stottlemeyer ................... 379/409 X |
| 4,644,579 | 2/1987 | Whittaker ............................ 379/388 |
| 4,712,231 | 12/1987 | Julstrom ............................. 379/202 |
| 4,718,099 | 1/1988 | Hotvet ............................ 381/106 X |

FOREIGN PATENT DOCUMENTS

| | | |
|---|---|---|
| 1318054 | 5/1973 | United Kingdom . |
| 1385493 | 5/1975 | United Kingdom . |
| 1546672 | 5/1979 | United Kingdom . |
| 1550721 | 8/1979 | United Kingdom . |
| 1553277 | 9/1979 | United Kingdom . |

OTHER PUBLICATIONS

Marosi, Acoustic Protector Damps Telephone-Line Transients, Electronics (Feb., 1979), pp. 115–117.

Primary Examiner—Jin F. Ng
Assistant Examiner—Randall S. Vaas
Attorney, Agent, or Firm—Arnold, White & Durkee

[57] ABSTRACT

Apparatus is provided for interfacing a voice communication instrument, e.g. headset, to a communication link, e.g. a telephone line. The interface includes a transmit channel having amplification, frequency shaping and voice switching to suppress background noise. The interface includes a receive channel having compression limiting as a function of the received signal amplitude and frequency. The interface further includes a power-down circuit and a low battery indicator.

6 Claims, 8 Drawing Sheets

FREQUENCY (HZ)

Fig. 6D

FREQUENCY (HZ)

Fig. 8

FREQUENCY (HZ)

Fig. 10

FREQUENCY (HZ)

VOICE COMMUNICATION LINK INTERFACE APPARATUS

FIELD OF THE INVENTION

The present invention relates to two-way, transmit and receive, voice communication over a wired interconnection to a communication link such as a telephone line. More particularly, the present invention relates to apparatus for interfacing a two-way voice communication instrument to the communication link and providing conditioning of voice signals being passed therebetween.

BACKGROUND OF THE INVENTION

Signal conditioning in voice communication, particularly telephone communication, primarily addresses the problems of weak incoming electrical voice signals and large amplitude electrical signals which produce acoustic shock to the listener's eardrum. To alleviate the problem of weak incoming electrical voice signals, additional receiver gain is beneficial. To obviate acoustic shock due to incoming electrical signals of excessive amplitude, compression of the incoming signal is needed to linearly reduce the output amplitude and at the same time avoid introducing harmonic distortion.

Heretofore, so-called "hard-of-hearing" amplifier devices have been utilized as a solution to weak incoming voice signals and high background noise environment problems. Illustrative of these devices if the Western Electric Co. 153B amplifier. However, such devices do not provide for compression of large amplitude incoming signals, with the result being that the listener is left vulnerable to very high sound pressure levels at the ear termed "acoustic shock."

Another device heretofore utilized to provide signal gain, yet compress received audio signals to a specific maximum level without harmonic distortion, is the Model ROC 0300 manufactured by Plantronics, Inc., Santa Cruz, Calif. 95060.

Yet another device for receiver condition is the SOUNDGUARD ® receiver conditioning circuit offered by Plantronics, Inc. This device is the subject of U.S. Pat. No. 4,536,888 issued Aug. 20, 1985, for "Voice Communication Instrument System With Line-Powered Receiver Conditioning Circuit" and assigned to Plantronics, Inc.

The prior devices which compress incoming signals do so regardless of received signal frequency. Compressing peak signals to less than 90 dB across the frequency spectrum will cause some loss of intelligibility. For example, a substantial difference in apparent receive loudness level exists between zero loop calls, such as calls within a building, and calls made through a central office. This is because of the rising frequency response on a zero loop call, whereas it is flattened out or even reduced on long loop calls.

The present invention seeks to provide an improved communications link interface which affords enhanced voice signal conditioning, particularly for received signals, in recognition of human speech/hearing characteristics. Human voice amplitude in normal speech is greatest between the frequencies of 300 Hz and 600 Hz. After attaining a peak amplitude in the vicinity of 600 Hz, voice amplitude tends to fall off rather rapidly. At a frequency of 3.3 KHz, voice amplitude may be down approximately 15–20 dB.

Human hearing sensitivity is low in the lower frequency ranges and increases as the frequency approaches the human voice frequency band. That is, human hearing sensitivity increases to a relatively higher level near 300 Hz. Between 300 Hz and 1000 Hz, hearing sensitivity is nearly constant. However, at approximately 1 KHz, hearing sensitivity begins to significantly increase. Hearing sensitivity peaks at approximately 3 KHz and then rapidly falls off. Increased hearing sensitivity in the 1 KHz to 3 KHz range is beneficial in terms of recognizing and understanding human speech in that frequency range. However, the significantly greater hearing sensitivity in this frequency range makes a person susceptible to acoustic shock and/or annoyance from high amplitude acoustic signals in this frequency range.

SUMMARY OF THE INVENTION

The present invention provides an interface between a two-way voice communication instrument and a communication link for voice signal conditioning. The invention is particularly adapted for use in interfacing a telephone instrument, e.g. a handset or a headset, to a telephone line circuit. The interface can include signal conditioning for either a transmit channel signal or a receiver channel signal, or for both. The interface may be implemented in discrete circuits, but the preferred implementation is in integrated circuit form.

Transmit signal conditioning includes amplification of a microphone signal. Transmit signal conditioning may also involve frequency shaping, voice switching to suppress background noise, or output signal amplitude adjustment.

Receiver signal conditioning involves linear compression limiting as a function of amplitude and frequency. That is, increasing compression limiting is applied to an incoming voice signal, having an amplitude level above a compression level threshold, as the signal increases in frequency. Thus, incoming voice signals at high frequency, e.g. greater than about 1000 Hz, and with high amplitude result in greater compression being applied. However, high frequency voice signals with low amplitude, and low frequency voice signals with high amplitude, result in less compression being applied. The control of applied compression to an incoming voice signal as a function of amplitude and frequency is referred to herein as "compression slope control". This variable control is to be contrasted to frequency response conditioning referred to in U.S. Pat. No. 4,536,888, which involves a step amplification boost in the 3 KHz response above the gain at 1 KHz.

The interface apparatus may also provide automatic received signal volume control adjustment which proceeds at a different rate for volume reduction than the rate for a volume increase. The volume control adjustment assumes a level setting initially and then slews to the appropriate level.

The interface apparatus may further include an operation power-down mode. This function reduces power consumption when the interface is not in use and preserves battery life.

BRIEF DESCRIPTION OF THE DRAWINGS

A written description setting forth the best mode presently known for carrying out the present invention, and of the manner of implementing and using it, is provided by the following detailed description of an illustrative embodiment shown in the attached drawing figures wherein.

DETAILED DESCRIPTION OF AN ILLUSTRATIVE EMBODIMENT

Figure 1:
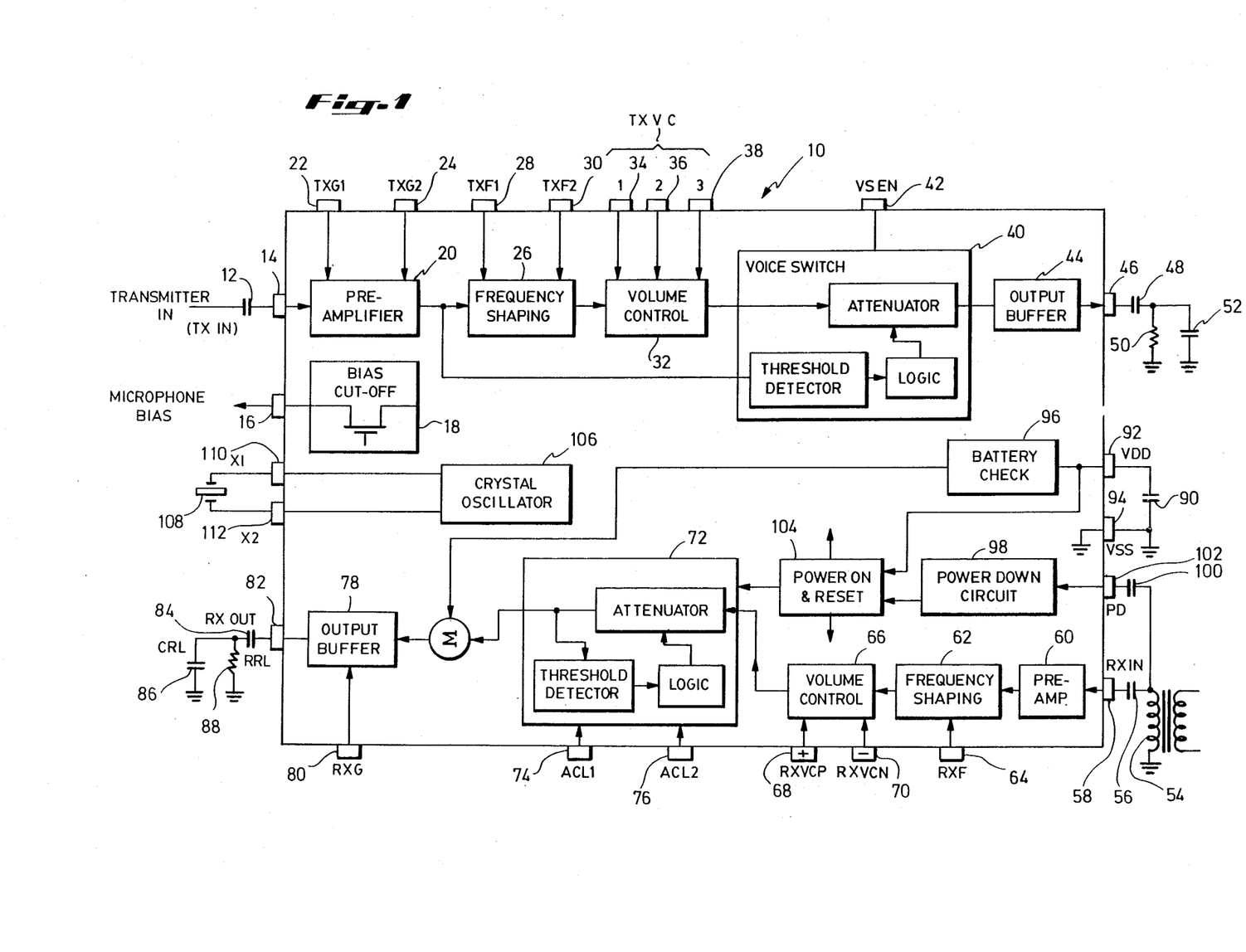
FIG. 1 is a functional block diagram of interface apparatus in accordance with the present invention.

Referring to FIG. 1, a diagram of interface apparatus 10 embodying the present invention is shown. The embodiment to be described is particularly adapted for coupling a two-way voice communication instrument of the telephone headset or handset type to a communication link in the form of a telephone line circuit. The interface 10 receives a transmitter input from a microphone transducer in the communication instrument. As is well known, a microphone transducer converts acoustic voice signals to electrical voice signals. Microphone electrical voice signals are typically conveyed from a transducer over wires which connect to the communication link. Similarly, the receiver transducer in the communication instrument receives electrical voice signals via wires, and converts these signals to audible sound signals. The electrical voice signal provided to the receiver transducer is from the receiver output of the interface. The telephone circuit type of communication link includes a conventional telephone hybrid circuit.

Interface 10 includes a transmit signal channel and a receive channel. The transmit channel provides the interface between the communication instrument microphone transmit transducer and the telephone line circuit. Similarly, the receive channel provides the interface between the telephone line circuit and the communication instrument receiver transducer. In FIG. 1, interface 10 is depicted as being implemented in integrated circuit form, which includes packaging in a conventional dual inline package having a plurality of connection pins. The circuit elements shown outside the block would be mounted as external components on a printed circuit board.

The transmit signal channel receives the transmitter input, i.e. microphone electrical voice signal, via coupling capacitor 12 connected to pin 14. A microphone bias signal is available at pin 16. Within interface 10 is a microphone bias source in the form of an FET switch 18 which is controlled by an internal power-enabled signal. Bias source 18 supplies bias current through an external resistor to an electret microphone. The transmit electrical voice signal input is applied to a preamplifier 20, including a programmable gain stage to amplify the low level input signal. The gain of preamplifier 20 is programmable to four levels of amplification corresponding to the four different states of the two binary inputs TxG1 and TxG2. The binary input signals are applied to pins 22 and 24. The output of pre-amplifier 20 is applied to a frequency shaping transmit filter 26. The frequency shaping characteristics provided by the filter are programmable based on binary inputs TxF1 and TxF2 applied to pins 28 and 30. The output of frequency shaping filter 26 is applied to volume control 32. Volume control adjustment of the transmit signal channel output is provided by a programmable attenuator in volume control 32. The amount of attenuation provided determines the gain of the transmit signal channel. The programmable attenuator is controlled in steps as established by the three binary inputs TxVc applied to pins 34, 36, and 38. The output of volume control 32 is applied to a voice switch 40 which also receives the output of pre-amplifier 20. Voice switch 40 changes the programmed gain of the transmit signal channel. When the average signal drops below a threshold level, the gain is increased. When the signal goes above the threshold level, the gain returns to the normal level. The voice switch includes an attenuator controlled by logic circuits in response to the output of a threshold detector which receives the pre-amplifier output. In addition, the voice switch can be programed to an "off" condition by the state of the VSEN signal applied to pin 42. The output of voice switch 40 is passed through an output stage 44 which contains a low impedance, high capacitance driver and an anti-aliasing filter. The signal from th output stage is available at pin 46. The transmitted electrical voice signal to be applied to the telephone circuit is coupled through capacitor 48 and an output network including resistor 50 and capacitor 52.

The input to the receive signal channel is a received electrical voice signal from the telephone line, available via the receiver port of a telephone set through a transformer 54 and coupling capacitor 56. The received electrical voice signal is applied to interface 10 at pin 58. The received electrical voice signal is first applied to pre-amp 60, which provides a fixed gain stage. The amplified signal from pre-amp 60 is then applied to frequency shaping filter 62. Frequency response shaping is in either of two programmable configurations, based upon the state of the control binary input RxF applied to pin 64. The output of filter 62 is then applied to volume control 66. Volume control 66 changes the level of the received electrical voice signal within a range of adjustment, and provides for establishment of a preset initial gain. Volume control 66 is programmable to the preset gain, based upon the condition of inputs RXVCP and RXVCN applied to pins 68 and 70. When the receive signal channel is powered-up, volume control 66 assumes the preset gain value. Thereafter, if volume control adjustment is made, such adjustment will proceed at a rate depending upon whether the adjustment is to increase or to reduce the volume setting. A reduction in volume proceeds faster than an increase in volume. A faster adjustment for volume reduction is desirable so that excessive gain can be reduced fast enough. It will be appreciated that incoming signal level on the telephone line may have large variation depending on line condition, and whether it originates as a local, outside, or long distance call. Should the preset gain be excessive in view of the incoming signal level, a fast reduction in gain is desirable.

The volume controlled electrical voice signal is applied to a compression limiting circuit 72. A sudden and continuous appearance of high amplitude level signals at the receiver transducer is undesirable. Furthermore, human hearing is more sensitive to high frequencies (e.g. above 3 KHz). Having the same amplitude, high frequency signals sound much louder than do signals at low frequency. Compression limiting circuit 72 provides compression limiting of the received electrical voice signal as a function of the amplitude and the frequency of the signal. The compression limiting action of circuit 72 limits the signal to a specific maximum amplitude level based not only upon the absolute signal level as received, but also based upon the frequency of the signal.

The compression limiting circuit 72 includes an attenuator for adjusting the gain applied to the signal provided from volume control 66. The gain adjustment is based upon a comparison of the attenuator output to a threshold setting. This comparison is made by a threshold detector which includes a first order high pass filter. This filter makes the compression limiting circuit more sensitive to high frequencies. The threshold level is established by the signals ACL1 and ACL2 applied via pins 74 and 76. The threshold detector and associated logic circuitry provides a control input to the attenuator.

The output of the compression limiting circuit is applied to an output buffer 78. This circuit is an output amplifier providing two different output levels, depending upon the sensitivity of the particular receiver transducer. Adjustment of the output level provided by buffer 78 assists in maintaining the same sound pressure level for a given signal level. The output level available from buffer 78 is programmable by signal RxG applied via pin 80. Buffer 78 is capable of driving low impedance and high capacitive loads and includes an antialiasing filter. The output signal from buffer 78 is available at pin 82, and is coupled through a network including capacitors 84, 86, and resistor 88.

Interface 10 is battery powered from battery 90 shown connected between device pins 92 and 94. A battery check circuit 96 is included. To reduce power consumption, a power-down circuit 98 is provided to disable the transmit and receive signal channels when interface 10 is not in use. The power-down circuit 98 activates the transmit and receive when there is a received electrical voice signal, including dial tone, present at the received signal channel input. This is accomplished using power-on and reset circuit 104. The capacitor 100 couples the signal from transformer 54 to the power-down circuit via pin 102. Additionally, interface 10 includes a crystal oscillator 106 having connection to an external crystal 108, via pins 110 and 112. The crystal oscillator is utilized in providing clock signals necessary for use in generating the timing signals required within the interface. It will be appreciated that the interface 10 may be realized in switched-capacitor technology, which would require a timing generator operating based upon a basic clock signal obtained from an oscillator.

Figure 2:
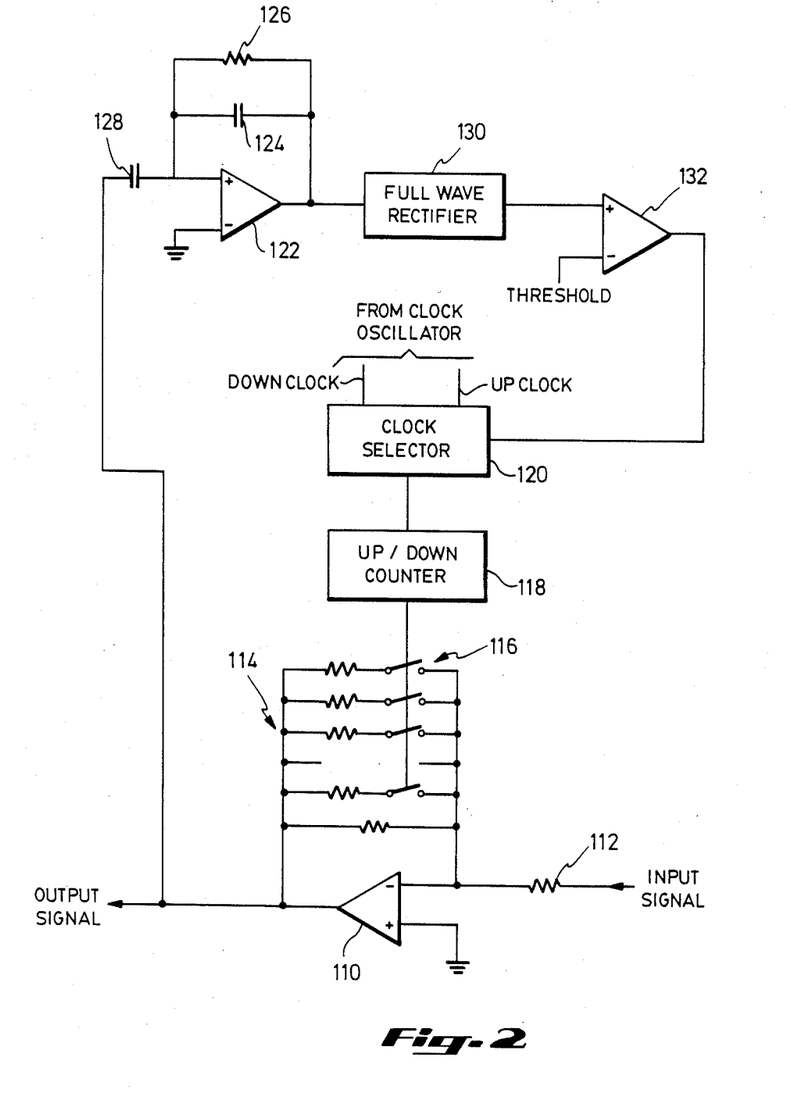
FIG. 2 is a diagram of the compression limiting portion of the receive channel.

Referring next to FIG. 2, there is shown a diagram of the compression limiting circuit 72 of the receive channel. The input signal is that obtained from volume control 66, and the output signal is that which is passed on to output buffer 78. The circuit includes an operational amplifier 110. The input signal is applied to the inverting input through resistor 112. The gain of amplifier 110 is determined by the ratio of the feedback resistor network 114 and input resistor 112. A parallel combination of resistors in network 114 is connected into the feedback loop by analog switches 116. When the switches are open, the gain is at its maximum. When the switches are closed, the gain is at its minimum. Switches 116 are controlled by an up/down counter 118. A six-bit counter is acceptable. When the amplifier gain is at its maximum, the binary output of counter 118 is in state zero; and the gain is at its minimum when the counter is in state 63 (binary 111111). Counter 118 counts up and down, based upon the different clock rates from a clock oscillator. The selection of either the down clock or the up clock is made in clock selector 120. The output signal from amplifier 110 is applied to a first order high-pass filter. This filter includes operational amplifier 122, a feedback network of capacitor 124 and resistor 126, and input coupling capacitor 128. The output of the filter is applied to a full-wave rectifier 130 to develop an input signal for comparator 132. A threshold voltage selected by inputs ACL1 and ACL2 (see FIG. 1) is applied to the inverting input of comparator 132. The output of comparator 132 provides a control signal to clock selector 120.

In operation, the input signal is amplified through stage 110. The amplified signal from the output of stage 110 passes on through the high-pass filter, and is applied to the full-wave rectifier. When the amplitude of the rectified signal reaches the threshold level, comparator 132 provides a "high" signal output. This signal causes selection of the up clock for application to counter 118. The counter is caused to count up, which results in a reduction of the gain of amplifier stage 110. The gain reduction continues until the peak value of the output signal is reduced to the threshold level. If the input signal level decreases, such that the output of the rectifier 130 goes below the threshold, comparator 132 produces a "low" signal output. This results in selection of the down clock for application to counter 118. The down clock causes counter 118 to count down, and results in an increase in the gain of amplifier 110. Counter 118 constantly changes its state, counting up or down, so as to maintain the output signal at the desired level, and prevent an excessively high amplitude output signal from being applied to output buffer 78. The rates of the up clock and the down clock may be selected to provide the desired attack and release times, and to assure the stability of the circuit.

The high-pass filter develops a different output signal for a given amplitude of its input signal, depending upon the frequency of the input signal. That is, for high signal frequencies, the output signal of the filter will produce a higher amplitude signal for comparison than will be produced for low frequency signals. This results in greater compression limiting being applied to high-frequency signals than low-frequency signals.

Figure 3:
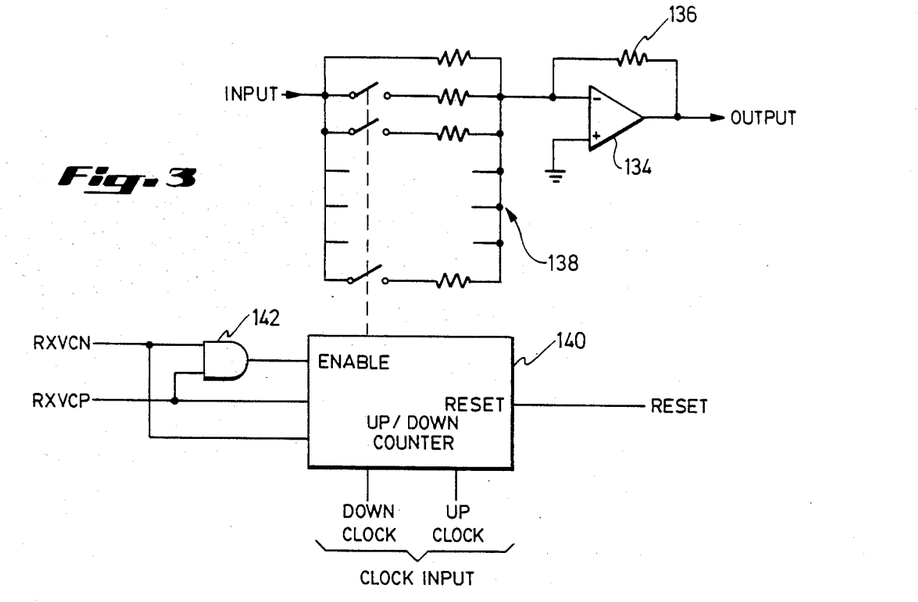
FIG. 3 is a diagram of the volume control portion of the receive channel.

In FIG. 3, the volume control circuit 66 is diagrammed. The input signal is from frequency shaping filter 62, and the output signal is that which is applied as the input signal to compression limiting circuit 72. The volume control circuit provides adjustment in the signal level within the available range, and establishes an initial preset gain at power-up of the received signal channel. The volume control circuit includes an operational amplifier 134 having a feedback resistor 136, and a variable resistor network 138. The ratio of the input resistance and resistor 136 establishes the gain of the amplifier stage. The gain is changed by connecting different resistors of network 138 to the inverting input of high pressure amplifier 134. Different combinations of input resistors are obtained by selected closure of analog switches.

The analog switches are controlled by an up/down counter 140. Suitably, counter 140 is a three-bit device. Counterstate zero (binary 000) corresponds to the lowest gain setting, and counterstate seven (binary 111) corresponds to highest gain setting. Counter 140 counts up and down based upon a clock input, including a down clock and an up clock. Inputs RXVCP and RXVCN control the direction of the count. The direction of the count is changed when either input is grounded. When both inputs are grounded, gate 142 disables the counter, and sets it to the highest setting, i.e. binary 111. Desirably, the up clock provides pulses every 0.6 seconds, and the down clock provides pulses every 0.3 seconds. Accordingly, the volume adjustment goes down twice as fast as it goes up. When power is applied to the receive signal channel, a reset signal input provides a pulse. This pulse resets the counter to state 3 (binary 011) which corresponds to approximately the middle of the volume control adjustment range.

Figure 4:
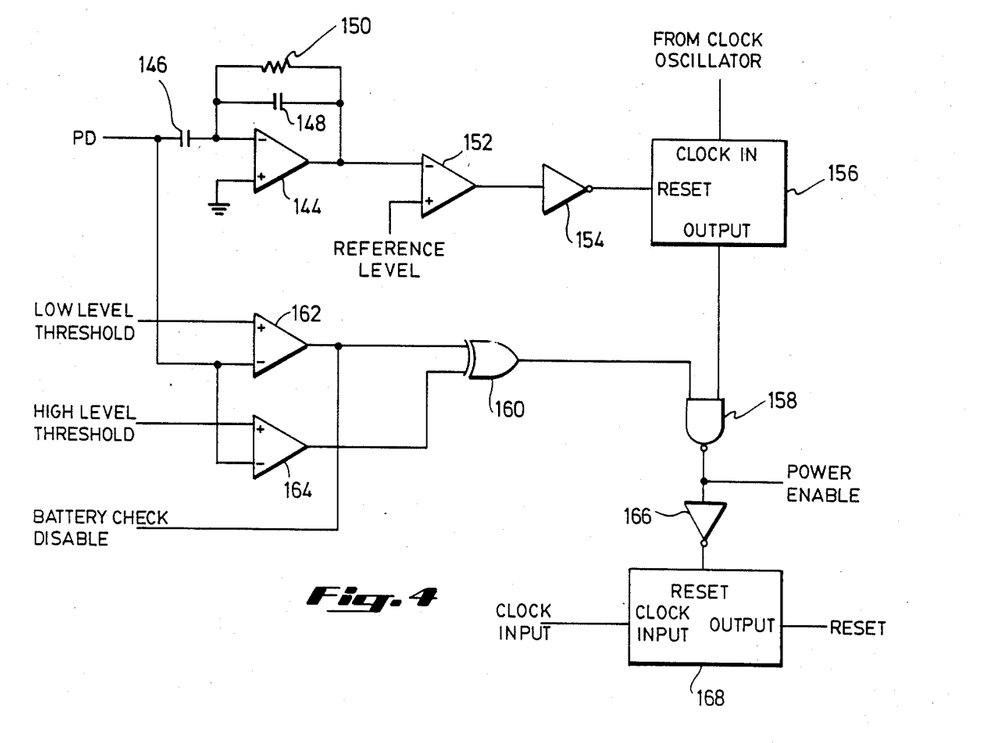
FIG. 4 is a diagram of the interface power-down stage.

FIG. 4 is a diagram of the power-down circuit 98. The function of the power-down stage is to lower power consumption of the interface when no signal is present on the receiver terminals on the handset port of the telephone, and to restore full functions when a signal appears. The receive port is a convenient place to sense if the telephone is off-hook. If there is voice on the telephone line, some signal will appear on the received port, whether it be from the side tone loop or from the other party to the communication. Also, when a handset is lifted, there is a transient signal, usually in the form of "click" which is enough to trigger the power-down circuit. Desirably, the power-down circuit has time "on" in a range of 25 milliseconds and time "off" of about two minutes. This means that after the signal on the receiver port disappears, the communication instrument will be fully operational for two minutes to prevent false cutoffs during periods of silence, e.g. a "mute" status.

The power-down circuit stage includes a preamplifier, including operational amplifier 144, capacitors 146 and 148, and resistor 150. After amplification, the signal is applied as an input to comparator 152. The other input is a reference voltage level. The output of comparator 152 is connected to inverter 154. When the signal exceeds the reference level, the inverter 154 sets a logic level "1" to reset timer 156. The output of the timer is applied as an input to NAND logic gate 158. The other input to gate 158 is the output of exclusive-or logic gate 160. Logic gate 160 produces its output based upon input signals obtained from comparators 162 and 164. These comparators both receive the input signal PD. Comparator 162 receives a low level threshold reference, and comparator 164 receives a high level threshold reference.

Based upon the timer 156 output and the output of logic gate 160, logic gate 158 produces a signal designated as "power enable". The output of logic gate 158 is also applied to inverter 166 to generate a reset input to counter 168. The output of counter 168 is the "reset" signal.

In operation, if the level of the input signal applied to the pre-amplifier is at a low level, such that the pre-amplifier output does not exceed the reference threshold level, the output of inverter 154 is at a logic "zero" and timer 156 is enabled. After two minutes, the timer provides a logic "one" to gate 158. If the input signal PD exceeds the low level threshold on comparator 162, the output of comparator 162 will assume a logic "zero". If the input signal does not exceed the high level threshold on comparator 164, the output of comparator 164 will remain a logic "1". These outputs of the comparators 162 and 164 will result in a logic "one" output from gate 160.

When gate 158 has both inputs at logic "one," its output providing the power enable signal will be a logic "zero". This condition of the power enable signal will remove power from the circuitry of the transmit and receive signal channels. Inverter 166 will provide a logic "one" to the reset input of counter 168, causing it to be disabled. The interface is then shut down.

When a strong signal appears at the input, the output of the pre-amplifier will exceed the reference threshold level on comparator 152 and result in pulses being produced. These pulses cause inverter 154 to apply reset pulses to timer 156 to maintain the timer output at a logic "zero". A logic "one" is produced at the output of gate 158 to generate the power enable signal. Additionally, the outputs of comparators 162 and 164 are both driven to a logic "zero". This causes gate 162 to establish the other input to gate 158 as a logic "zero". Inverter 166 enables timer 168; after 25 milliseconds, timer 168 produces a logic "one". During the 25 millisecond period, the logic "zero" signal at the output of timer 168 provides a reset signal to the circuitry of the transmit and receive signal channels, which initializes the circuitry to preset operational values.

Figure 5:
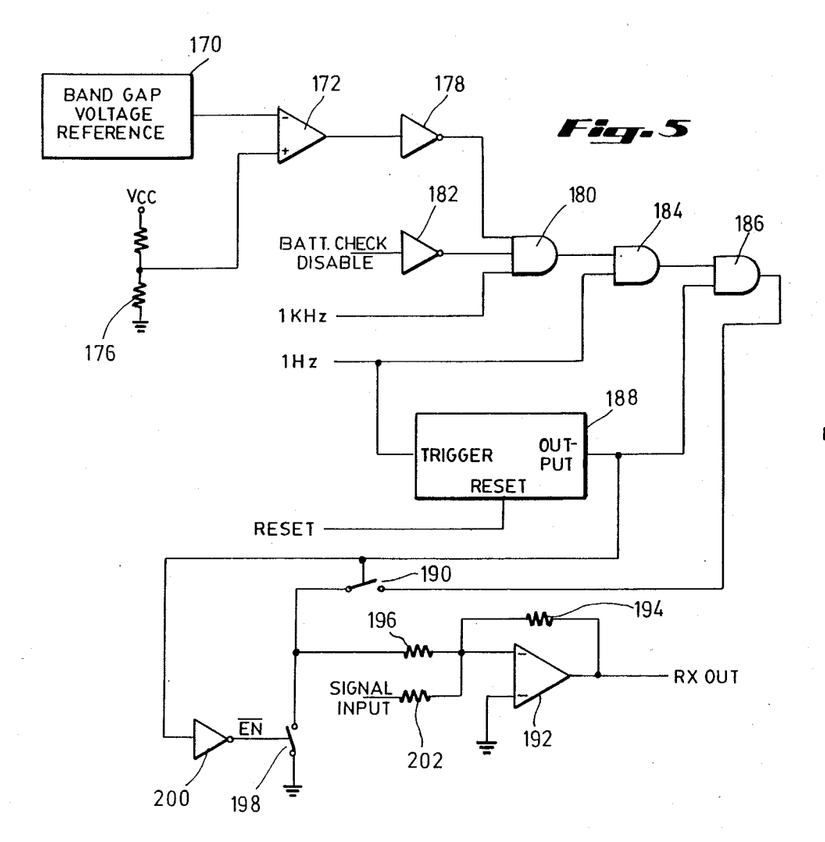
FIG. 5 is a diagram of the low battery indication stage.
Figure 6A:
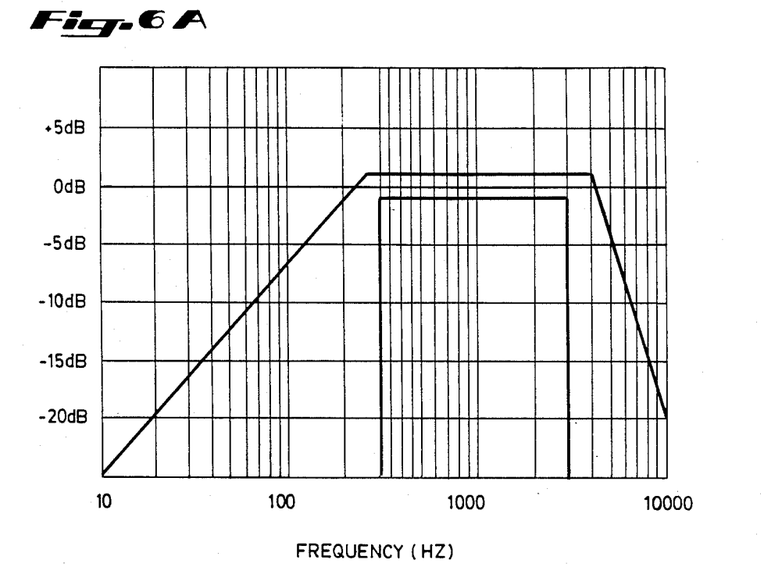
FIGS. 6A, 6B, 6C and 6D illustrate the transmit frequency shaping options available via the programmable transmit filter.
Figure 6B:
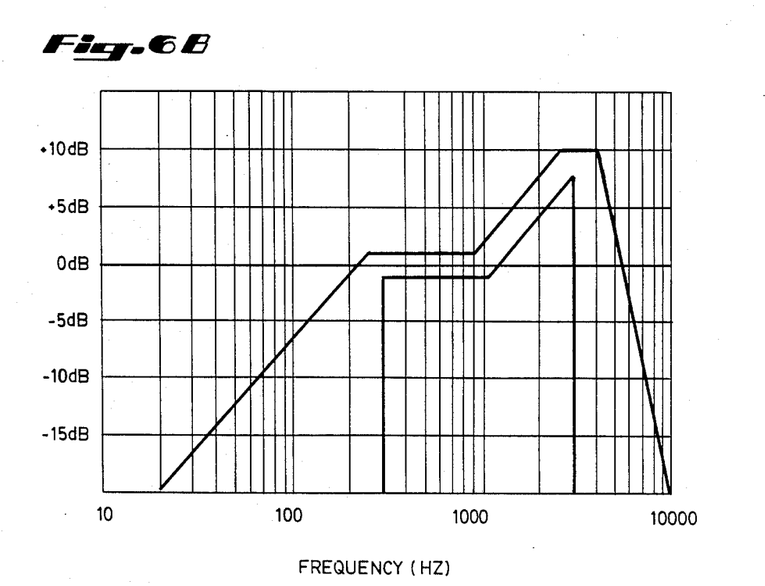
Figure 6C:
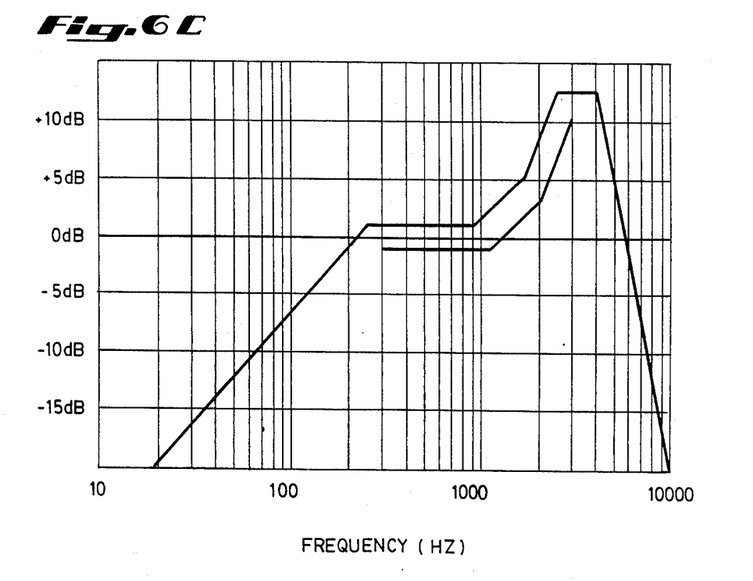
Figure 6D:
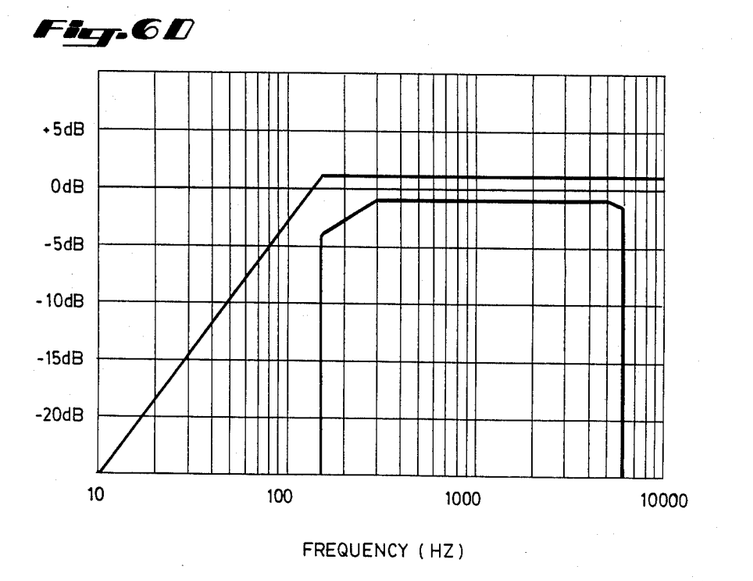

The low battery voltage indicator circuit is shown in FIG. 5. The function of this circuit is to inject toneburst into the receive signal channel of the interface. A band-gap voltage reference 170 provides a reference voltage to the inverting input of comparator 172. The non-inverting input of the comparator is connected to a voltage divider network of resistors 174 and 176. The output voltage of the divider network is proportional to the supply (battery) voltage When the supply voltage is low, the output of the comparator is low. But, when the battery voltage is higher than the reference voltage, the output of the comparator 172 is high. The logic level at the output of comparator 172 is inverted by inverter 178, and applied as an input to AND gate 180. Inverter 182 receives a battery check disable input signal, and provides another input to gate 180. The third input to gate 180 is a one KHz signal. The signal input from inverter 182 provides a logic signal for disabling or enabling the low battery indication. The output of gate 180 provides a one KHz logic signal when the battery check is enabled and the battery voltage is low.

The logic signal from gate 180 is applied as an input to gate 184. The other input to gate 184 is a one Hz logic signal. When the battery voltage is low, the output of gate 184 is a logic level tone burst signal at one Hz intervals. The output of gate 184 is applied to one of the inputs of gate 186. The other input to gate 186 is from the output of timer 188. The input to timer 188 is the one Hz signal. When the interface is poweredup, the reset input to timer 188 is held so as to produce a logic "one" at the output of timer 188. After three one Hz pulses, the output of timer 188 goes to a logic "zero" and remains there until the interface is powered-down. Therefore, the output of gate 186 provides three tone bursts of one KHz at the one Hz intervals.

The output of gate 186 is applied through analog switch 190 to operational amplifier 192. This amplifier is in the signal path of the receive signal channel. The ratio of resistors 194 and 196 determines the amplitude of the tone burst at the receive signal channel output. Preferably, the amplitude is set to be 10 dB lower than the nominal receive signal level, so as to not interfere with audio signal, yet will be clearly audible.

Analog switch 190 is controlled by the signal from the output of timer 188. This switch is conducting until the output of timer 188 is a logic "zero". After the switch opens, analog switch 198, which is controlled by inverter 200, closes. This operation disconnects the low battery indicator from the receive channel. The receive signal channel input applied via resistor 202 is then the only signal applied to amplifier 192.

When power is first applied to the interface circuitry, the reset pulse clears timer 188. If the battery voltage is low and battery check is enabled, gate 186 produces the three tone bursts. Amplifier 192 passes these tone bursts to the receive signal channel output for application to the receiver transducer in the communication instrument. After the low battery indicator circuit disconnects itself from the received signal channel, normal operation is resumed. If battery voltage is high, or battery check is disabled, no tone burst signal will be applied to the received signal channel from the low battery indicator.

With regard to the transmit signal channel, as previously discussed, the frequency shaping filter is programmable to provide four choices of frequency response. Illustrated in FIGS. 6A, 6B, 6C and 6D are the four preferred frequency response choices. These graphs of frequency response are believed self-explanatory to those of ordinary skill in the art, who will readily understand the information represented. Further, it is believed to be within the skill of the art to realize programmable filters for providing these frequency response characteristics.

Figure 7:
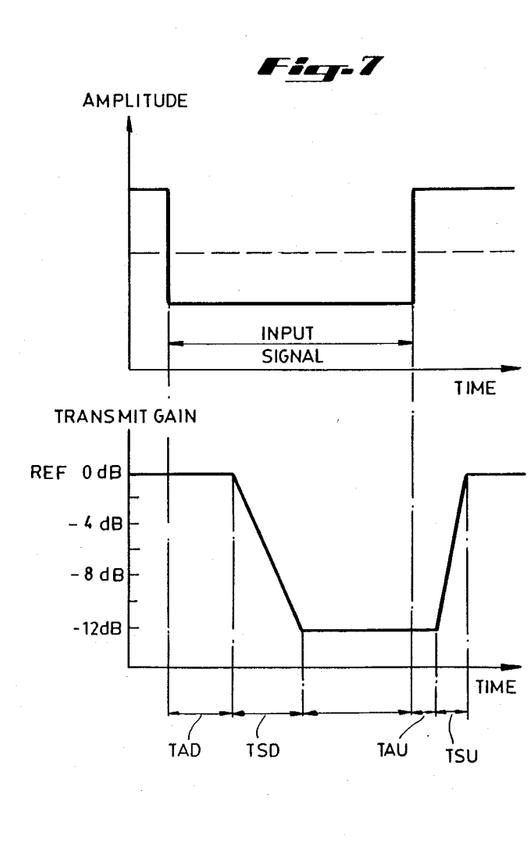
FIG. 7 illustrates the operation of the transmit voice switch.
Figure 8:
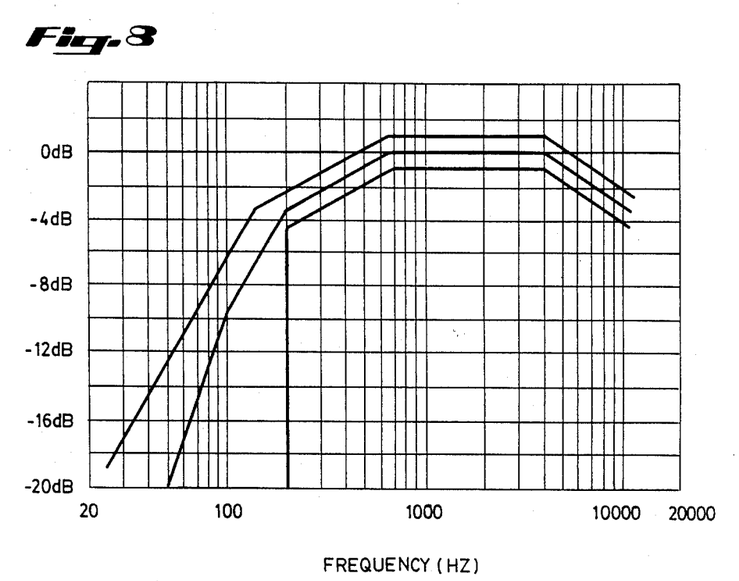
FIG. 8 illustrates the frequency response of the transmit voice switch.

Referring to FIG. 7, there is shown the timed response of the voice switch of the transmit signal channel. In FIG. 8, there is shown the frequency response characteristics of the voice switch. As indicated in FIG. 7, the voice switch changes the programmed gain of the transmit signal channel. When the averaged signal drops below the threshold level, the gain gradually rises after a delay time. When the signal goes above the threshold level, the gain returns to the normal level after a delay time. Circuitry for implementing the functional operation shown in FIG. 7 and the frequency response characteristics of FIG. 8 is believed to be within the skill of the art. Similarity should be noted between the voice switch of the transmit signal channel and the compression limiting circuit of the receive signal channel.

Figure 9A:
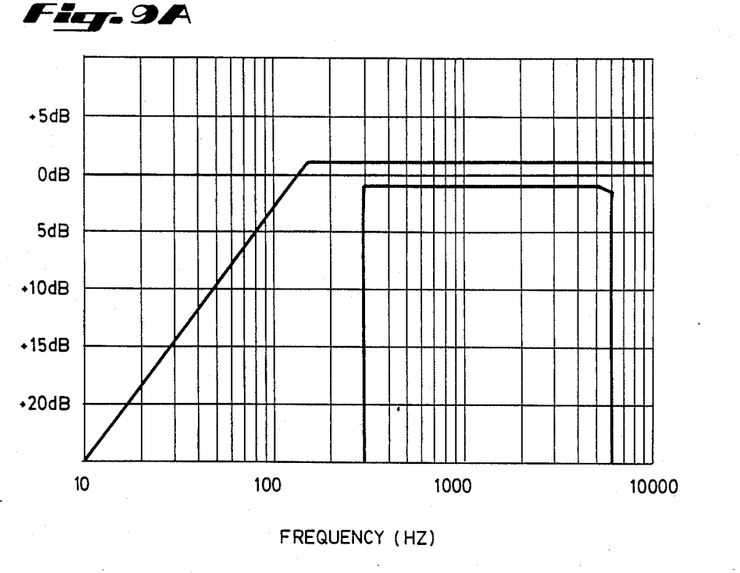
FIGS. 9A and 9B illustrate the programmable configurations of the receive filter frequency response.
Figure 9B:
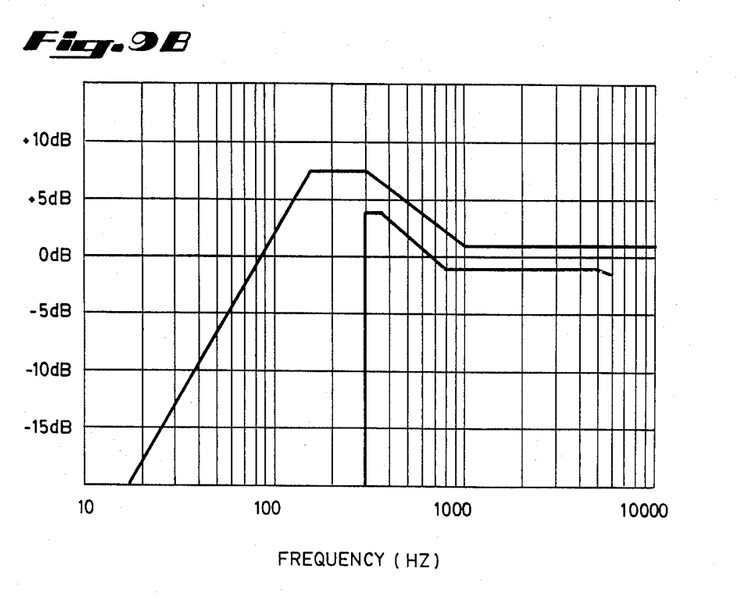

Referring next to FIGS. 9A and 9B, there is shown two desired filter response characteristics for the programmable receive filter. The design of a frequency shaping filter to have the frequency response characteristics shown in FIGS. 9A and 9B is believed to be within the abilities of those having ordinary skill in the art.

Figure 10:
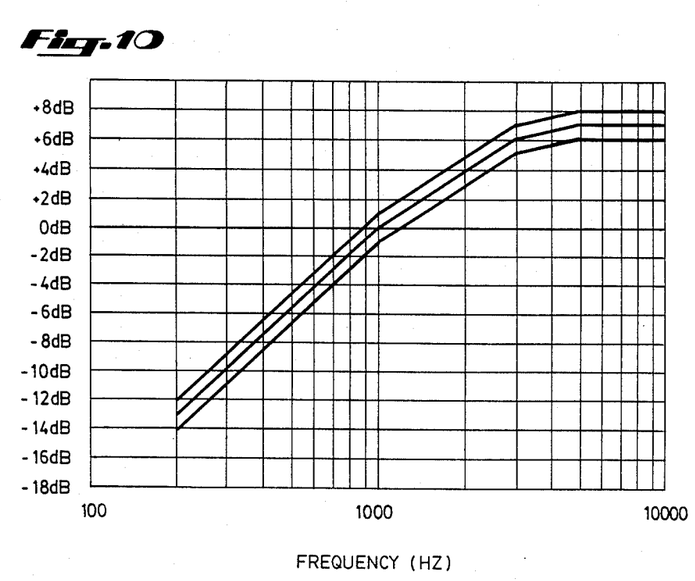
FIG. 10 illustrates the frequency response of the compression limiting circuit.

With regard to the compression limiting function in the receive signal channel, the diagram of FIG. 10 illustrates the frequency shaping provided. The diagram of FIG. 10 further shows that the compression limiting function proceeds on a basis wherein there is greater sensitivity to high frequency signals.

While the preferred embodiment described herein is battery powered, alternate ways of powering portions of the interface circuitry could be utilized. In U.S. Pat. No. 4,536,888, the receive signal channel circuitry is "line-powered" in that electrical operating power is supplied from the telephone line. Such operation could be utilized in various forms of the present invention. Accordingly, U.S. Pat. No. 4,536,888 is hereby incorporated by reference.

The foregoing description has been of but one implementation of the invention. Many uses and modifications of the present invention will be apparent to those skilled in the art. It is, accordingly, the intention that the following claims cover all equivalent modifications and variations as fall within the scope of the invention.

What is claimed is:

1. Apparatus for interfacing a two-way voice communication instrument to a communication link, comprising:
   a transmit signal channel to provide an electrical voice signal to the communication link; and
   a receive signal channel to provide a received electrical voice signal to the communication instrument,
   the receive signal channel including a circuit providing compression limiting to the received electrical voice signal as a function of the frequency and amplitude of the received electrical voice signal and a volume control circuit programmable to a preset gain within the total range of gain adjustment, said volume control providing an increase in volume at a first rate and a reduction in volume at a second, faster rate.

2. Apparatus for interfacing a two-way voice communication instrument to a communication link, comprising:
   a transmit signal channel to provide an electrical voice signal to the communication link;
   a receive signal channel to provide a received electrical voice signal to the communication instrument,
   the receive signal channel including a circuit providing compression limiting to the received electrical voice signal as a function of the frequency and amplitude of the received electrical voice signal; and
   a low voltage indicator to generate an external indication when the voltage level of a power source coupled to the apparatus decreases below a predetermined level.

3. The apparatus of claim 2 wherein the low voltage indicator includes means for injecting tone-burst into the receive signal channel.

4. Apparatus for interfacing a two-way voice communication instrument to a communication link, comprising:
   a transmit signal channel to provide an electrical voice signal to the communication link; and
   a receive signal channel to provide a received electrical voice signal to the communication instrument,
   the receive signal channel including
   a variable attenuator comprising an operational amplifier having a gain control resistor network programmable by a binary control input;
   a threshold detector including a high-pass filter receiving the output signal of the attenuator, and a comparator having a first input coupled to the filter output and a second input coupled to a preselected voltage level, the output of the comparator providing a binary output signal;

a selector circuit receiving first and second clocking signals, the selector circuit selecting one of the clocking signals based upon the binary output signal of the comparator; and an up/down counter for receiving the selected clocking signal to change a count value, the counter providing the binary control input to program the gain control resistor network of the attenuator.

5. The apparatus of claim 4 further comprising a clock generator producing the first and second clocking signals, the clock generator producing the first clocking signal to have a frequency different from the frequency of the second clocking signal to cause the counter to increment at a first rate and to decrement at a second rate.

6. Apparatus for interfacing a two-way voice communication instrument to a communication link, comprising:

a transmit signal channel to provide an electrical voice signal to the communication link;

a receive signal channel to provide a received electrical voice signal to the communication instrument, the receive signal channel including a circuit providing compression limiting to the received electrical voice signal as a function of the frequency and amplitude of the received electrical voice signal; and a power-down circuit to lower power consumption when no signal is present and to restore full function when a signal appears, said power-down circuit including a timer to produce a power-down control signal and a counter to produce a reset signal.

* * * * *